Patented May 20, 1947

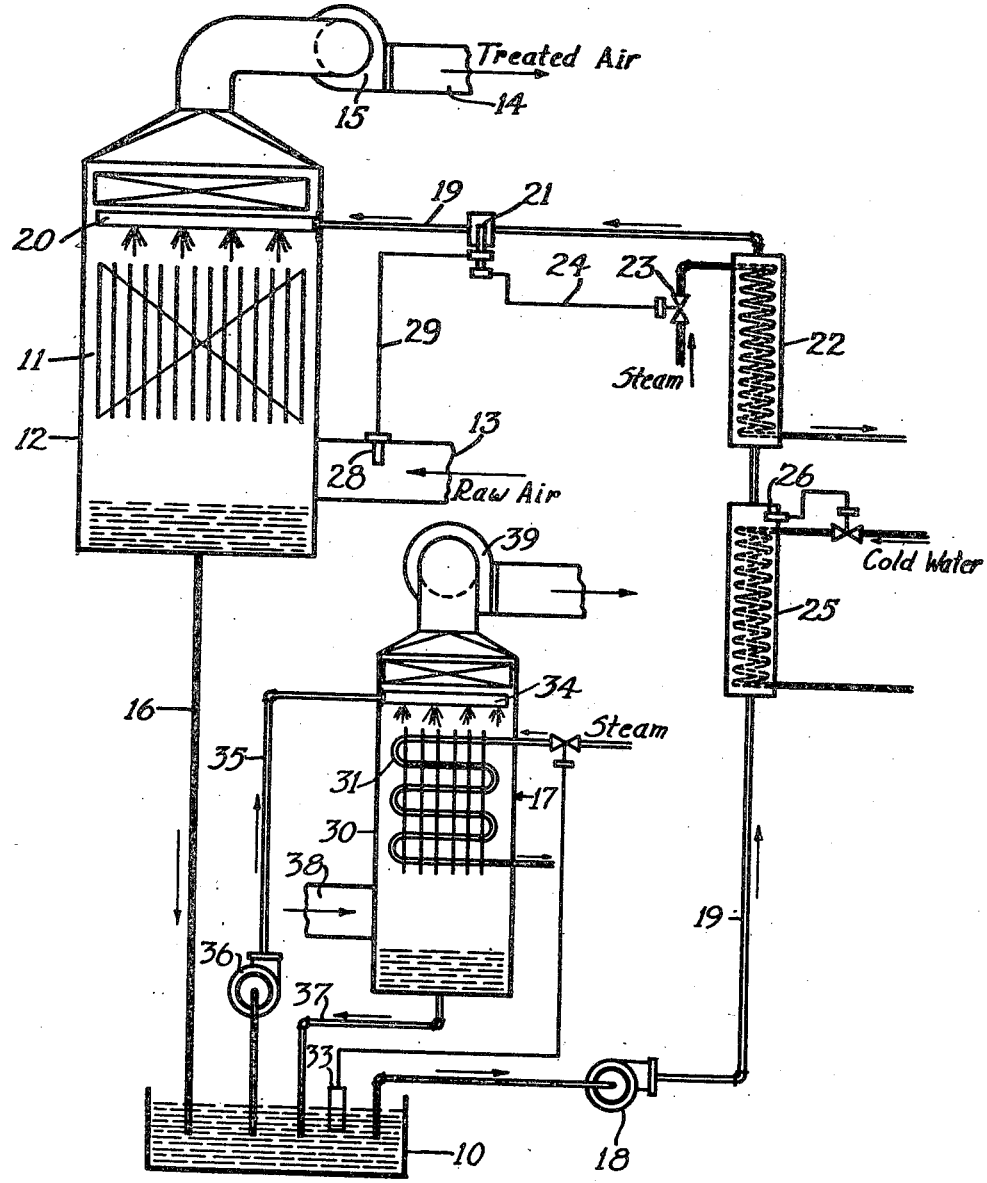

2,420,993

UNITED STATES PATENT OFFICE 2,420,993

AIR CONDITIONING APPARATUS

Gilbert A. Kelley, Toledo, Ohio, assignor to Surface Combustion Corporation, Toledo, Ohio, a corporation of Ohio Application November 11, 1943, Serial No. 509,928

1 Claim. (Cl. 236—44)

This invention relates to apparatus for dehumidifying air by means of a hygroscopic liquid such as a solution of lithium chloride or other hygroscopic salt. The moisture absorbing capacity of a hygroscopic liquid varies inversely with the temperature of the liquid, and it has been proposed to control the moisture content of the treated air by controlling the temperature of the said liquid by means including a dry bulb and a wet bulb thermostat located in the stream of treated air from the apparatus.

Any deposit on the wet bulb instrument, such as salt accumulation due to rapid evaporation of water at low vapor pressures or dirt collecting on the wet bulb will result in a high wet bulb reading. For example, if the job is designed to maintain 95° dry bulb, 64° wet bulb, and 40 grains of moisture per pound of dry air from the dehumidifying equipment, a rise of 1° in wet bulb reading due to fouling of the wet bulb will cause the control to maintain 63° wet bulb when 64° wet bulb is indicated by wet bulb instrument. This false reading will then maintain 95° dry bulb, 63° wet bulb, 35 grains of moisture per pound of dry air, although the control indicates 40 grains of moisture per pound of dry air.

This variation is satisfactory in some installations but is not good enough for control for important industrial processing application such as dry blast air to a blast furnace or cupola or on other industrial processing jobs where it is necessary to maintain the moisture content of the air during an entire year's operation within, say, plus or minus 2 grains of moisture per pound of dry air.

The object of the present invention is to provide a control system which shall embody a wet bulb thermostat but which shall nevertheless permit a closer control of the moisture content of the treated air to be maintained than has heretofore been possible with control systems embodying a wet bulb thermostat in the treated air for controlling the temperature of the hygroscopic liquid.

In accordance with the present invention the wet bulb thermostat is not located in the stream of treated air from the dehumidifying apparatus but in the stream of untreated air flowing to the apparatus for contact with the hygroscopic liquid. This change of location of the wet bulb thermostat is an important feature of the invention, because for one thing due to the relatively higher moisture content of the untreated air and, therefore, higher vapor pressure of the wick water fouling of the wet bulb by salt deposits from the wick water is a much slower process than is the case when the wet bulb is located in the relatively dry treated air. Also, due to the change in location, a false reading of the wet bulb thermostat, as will be shown later, does not critically affect the control of the leaving air as is the case when the wet bulb thermostat is in the leaving air.

In accordance with the present invention a thermostat responsive to the temperature of the hygroscopic solution flowing to the air and liquid contact means is provided for maintaining the said temperature substantially constant and the wet bulb thermostat is employed for adjusting the setting of the solution thermostat to maintain a higher or lower solution temperature depending on whether the wet bulb temperature of the entering air decreases or increases, respectively. The particular solution temperature required to produce a particular moisture content in the air depends on the particular hygroscopic solution employed and on the concentration of the solution. The following schedule shows what the temperatures of a lithium chloride solution of a certain concentration should be to maintain a certain moisture content in the treated air under varying wet bulb temperatures of the untreated air.

| Wet Bulb | Lithium Chloride Solution Temperature |
|---|---|
| Degrees | Degrees |
| 80 | 94.3 |
| 75 | 95 |
| 65 | 96.5 |
| 55 | 97.8 |
| 45 | 99.3 |
| 35 | 100.8 |

For any given chemical dehumidifying solution the wet bulb temperature of the air to the equipment is representative of the total amount of work to be done on the air for a given temperature and concentration of the solution. The above schedule will maintain the moisture content of the treated air during an entire season's operation within the limits of from 34 to 38 grains of moisture per pound of dry air in the leaving air when nothing more than a wet bulb thermostat is used to reset the liquid temperature controller.

If a more accurate control than this is desired, an instrument or combination of instruments responsive to the moisture content of the untreated air can be placed in the untreated air. One method of accomplishing this would be to place a dry bulb and a wet bulb thermostat in the untreated air with means to keep the air to the dry bulb thermostat at constant dry bulb temperature. The variation in the wet bulb temperature will then be representative of the moisture content of the air and will adjust the setting of the solution thermostat to maintain a higher or lower solution temperature depending on whether the moisture content of the entering air decreases or increases, respectively.

By placing the wet bulb thermostat in the entering air, there is less likelihood of salt deposits or other contamination on the wick causing inadequate control due to faulty wet bulb readings. For example, a wet bulb controller in the leaving air from the equipment and which reads 3° higher than the correct wet bulb temperature would, when the equipment is designed for 95° dry bulb, 64° wet bulb, give an error of 15 grains of moisture per pound of dry air in the leaving air. This difference would cause trouble in many industrial processes. However, if the wet bulb controller is in the entering air and is operating according to the schedule outlined above an error of 3° in the wet bulb controller would only result in a change in the leaving air of approximately 1 grain of moisture per pound of dry air.

In the accompanying drawing forming part of this specification, the single view is a more or less diagrammatic representation of a chemical dehumidifying system embodying the present invention.

In the drawing 10 indicates a sump or container for a body of hygroscopic liquid which for the purpose of this description can be considered as being a solution of lithium chloride. Liquid from the sump and the air to be treated are brought together in intimate contact in a gas and liquid contact means schematically indicated at 11 inside of a housing or casing 12 to which the air to be treated is delivered by a conduit 13 and from which the treated air flows by way of a conduit 14 in which is a suction fan 15 for causing the air from conduit 13 to flow upward through the contactor 11. The spent solution flows back to the sump 10 by way of a return pipe 16 from the bottom of the casing 12. Any preferred means generally indicated at 17 is employed for maintaining the liquid in the sump at a substantially constant concentration. Liquid from the sump 10 is delivered to the contactor 11 by means comprising a pump 18 in a supply line 19 which delivers to a spray head 20 above the contactor. The construction thus far described represents nothing new.

In the supply line 19 leading from the sump 10 to the spray head 20, a thermostat 21 is immersed in the solution flowing to the spray head for so controlling the operation of a heat exchanger 22 that the solution supplied to said spray head will be at a substantially constant temperature depending on the setting of the thermostat. For the purpose of this description the heat exchanger can be considered a heater embodying a steam coil to which the flow of steam is controlled by a valve 23 whose setting is controlled by the thermostat 21 as indicated by the connection 24. To insure that the solution flowing to the heater 22 is relatively cool, there is shown as interposed in the supply line between the heater and the sump 10 a cooler 25 embodying a solution thermostat 26 for controlling the flow of cooling fluid such as cold water to the cooler.

In accordance with the present invention the temperature of the hygroscopic solution supplied to the spray head 20 is increased or decreased a predetermined degree depending on the decrease or increase respectively of the moisture content of the raw or fresh air that is being delivered to the dehumidifying apparatus for treatment. In accordance with the present invention this change in temperature of the dehumidifying solution is accomplished by adjusting the temperature setting of the solution thermostat 21 by means comprising a wet bulb thermostat 28 or its equivalent in the raw air supply conduit 13, the operating connection between the two thermostats being indicated at 29. The advantages resulting from controlling the temperature of the solution by means under the control of the moisture content of the raw or untreated air have already been explained.

The means 17 for maintaining the liquid in the sump 10 at substantially constant concentration has been shown as comprising a casing 30 wherein is housed a steam coil 31 to which the flow of steam is controlled by a valve 32 whose setting is controlled by an instrument 33 responsive to the density of the liquid in the sump. Disposed over the steam coil is a spray head 34 to which liquid from the sump is conducted by a pipe 35 which includes a pump 36. A pipe 37 returns the concentrated liquid back to the sump. Air entering the casing at 38 is drawn through the casing by a suction fan 39 for carrying off the steam from the heated liquid.

What I claim is:

In apparatus for treating air to produce a stream of air of substantially constant water vapor content, the combination which comprises a dehydrating chamber to which initially separate streams of air and hygroscopic liquid are conducted for intimate contact with each other, means comprising an adjustable control means which is responsive to the temperature of the hygroscopic liquid being conducted to said chamber for maintaining the said temperature substantially constant depending on the setting of said control means, and means comprising a wet bulb thermostat responsive to the wet bulb temperature of the full complement of the air being conducted to said dehydrating chamber for adjusting the setting of the said control means in such direction as to insure an increase or decrease in the temperature of the said liquid in accordance as the said wet bulb temperature decreases or increases, respectively.

GILBERT A. KELLEY.

REFERENCES CITED

The following references are of record in the file of this patent:

UNITED STATES PATENTS

| Number | Name | Date |
| --- | --- | --- |
| 2,019,291 | Brace et al. | Oct. 29, 1935 |
| 2,133,334 | Rosett | Oct. 18, 1938 |